United States Patent [19]

Moreau

[11] 4,078,153
[45] Mar. 7, 1978

[54] CLOCK SIGNAL AND AUXILIARY SIGNAL TRANSMISSION SYSTEM

[75] Inventor: Jean-Louis Yves Charles Moreau, Juvisy-sur-Orge, France

[73] Assignee: International Standard Electric Corporation, New York, N.Y.

[21] Appl. No.: 728,494

[22] Filed: Sep. 30, 1976

[51] Int. Cl.² .............................................. H04L 7/00
[52] U.S. Cl. ............................ 178/69.1; 179/15 AW; 179/15 BM; 179/15 BS; 325/40
[58] Field of Search ................... 358/145, 147; 325/39, 325/40; 179/15 A, 15 AW, 15 BM, 15 BS; 178/69.1

[56] References Cited

U.S. PATENT DOCUMENTS

| 2,523,279 | 9/1950 | Chatterjea et al. | 179/15 AW |
| 2,728,817 | 12/1955 | Person et al. | 179/15 AW |
| 3,862,363 | 1/1975 | Tanimoto | 179/15 AW |

Primary Examiner—Robert L. Richardson
Attorney, Agent, or Firm—John T. O'Halloran; Alfred C. Hill

[57] ABSTRACT

The transmission system enables clock signals and auxiliary signals to be transmitted over a single channel, thereby avoiding the necessity of providing an independent auxiliary signal channel. This is accomplished by shifting in time the rising edges of the basic clock signal in the sending circuit as a function of the auxiliary signals to be transmitted, and then detecting this time-shift at the receiving circuit to recover the auxiliary signals. The clock signal is regenerated at the receiving circuit from the falling edges of the received clock signals.

8 Claims, 7 Drawing Figures

CLOCK SIGNAL AND AUXILIARY SIGNAL TRANSMISSION SYSTEM

BACKGROUND OF THE INVENTION

The invention relates to a transmission system for transmitting clock signals and auxiliary signals from a sending circuit to at least one receiving circuit, the sending circuit possessing a clock to produce two-level periodic clock signals separated by transitions in a first direction and a second direction.

This system has important applications, and in particular allows the distribution of clock signals to different points in large electronic systems (e.g., computers, telephone exchanges). Clock signal repeaters are provided at these different points, these repeaters producing different clock signals whose frequencies are multiples of each other. In order to obtain these different signals, use is made of frequency dividers, for example, which need to be periodically energized. This energization can be performed by means of auxiliary signals, which, in accordance with current practice, are transmitted by an independent transmission channel materially different from that transmission channel used to transmit the periodic clock signals. The presence of this additional channel is considered as a disadvantage, since additional conductors or channels must be employed.

SUMMARY OF THE INVENTION

An object of the present invention is to provide a clock signal and auxiliary signal transmission system that does not require the use of an additional channel or conductor to transmit the auxiliary signal.

A feature of the present invention is to provide a transmission system for transmitting clock signals and auxiliary signals from a sending circuit to at least one receiving circuit comprising: the sending circuit including first means to produce periodic two-level clock signals each having a first transition in one direction and a second transition in a direction opposite the one direction, and second means coupled to the first means to shift in time one of the first and second transitions as a function of the auxiliary signals; and the receiving circuit including third means coupled to the second means to detect the shift in time of the one of the first and second transitions and to produce the auxiliary signals as a first output signal of the receiving circuit.

Another feature of the present invention is to provide a sending circuit for transmitting clock signals and auxiliary signals to at least one receiving circuit comprising: first means to produce periodic two-level clock signals each having a first transition in one direction and a second transition in a direction opposite the one direction, and second means coupled to the first means to shift in time one of the first and second transitions as a function of the auxiliary signals.

A further feature of the present invention is to provide a receiving circuit for receiving clock signals and auxiliary signals transmitted from a sending circuit comprising: first means to receive periodic two-level clock signals each having a first transition in one direction and a second transition in a direction opposite the one direction, one of the first and second transitions being shifted in time as a function of the auxiliary signals; and second means coupled to the first means to detect the shift in time of the one of the first and second transitions and to produce the auxiliary signals as a first output signal of the receiving circuit.

Still another feature of the present invention is to provide a method of transmitting clock signals and auxiliary signals from a sending circuit to at least one receiving circuit comprising the steps of generating in the sending circuit periodic two-level clock signals each having a first transition in one direction and a second transition in a direction opposite the one direction; shifting in time in the sending circuit one of the first and second transitions as a function of the auxiliary signals; and detecting in the receiving circuit the shift in time of the one of the first and second transitions to recover the auxiliary signal.

Still a further feature of the present invention is to provide a method of combining clock signals and auxiliary signals for sending to at least one receiving circuit comprising the steps of generating periodic two-level clock signals each having a first transition in one direction and a second transition in a direction opposite the one direction; and shifting in time one of the first and second transitions as a function of the auxiliary signals.

Another feature of the present invention is to provide a method of recovering clock signals and auxiliary signals received from a sending circuit in the form of periodic two-level clock signals each having a first transition in one direction and a second transition in a direction opposite the one direction, one of the first and second transitions being shifted in time as a function of the auxiliary signals comprising the steps of generating from the shift in time of the one of the first and second transitions the auxiliary signals; and generating from the other of the first and second transitions the clock signals.

One advantage of the present invention is that the clock and auxiliary signals are transmitted by two-level signals, and another advantage is that a wide variety of auxiliary signals can be transmitted by varying the amount of shift in time of the transitions in the first direction of the clock signal.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
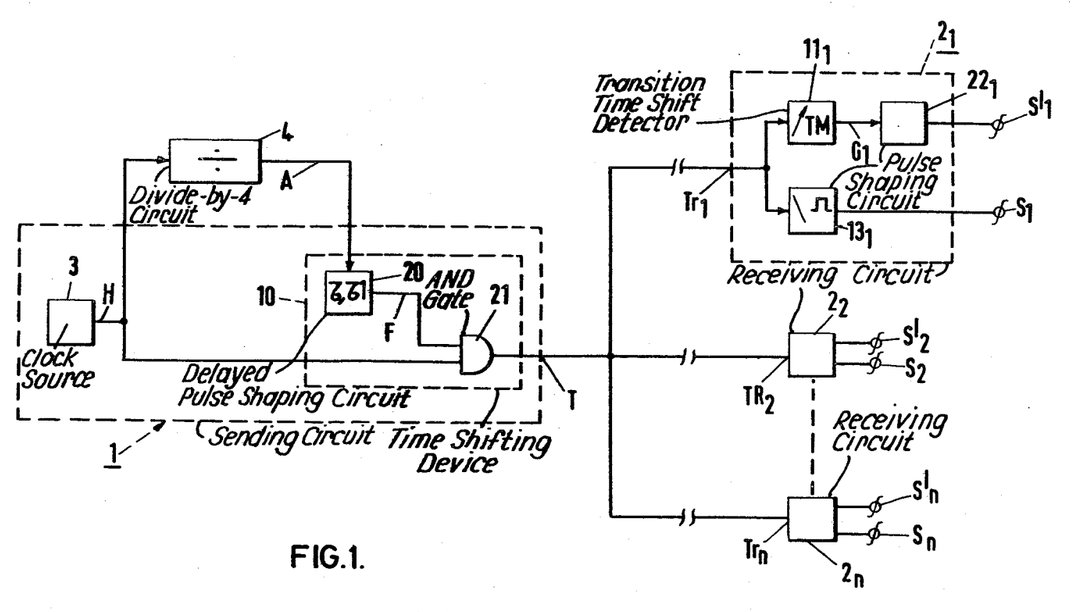
FIG. 1 is a block diagram of one embodiment of a transmission system in accordance with the principles of the present invention.

Referring to FIG. 1, the sending circuit is indicated by the reference number 1, while the receiving circuits are indicated by the reference numbers $2_1, 2_2, \ldots 2_n$. The inputs $Tr_1, Tr_2, \ldots Tr_n$ of the receiving circuits 2 are connected to the output T of sending circuit 1. The signals representing the clock signals appear on the outputs $S_1, S_2, \ldots S_n$ of receiving circuits 2, while the auxiliary signals appear on terminals $S'_1, S'_2, \ldots S'_n$ of these same circuits.

Figure 2:
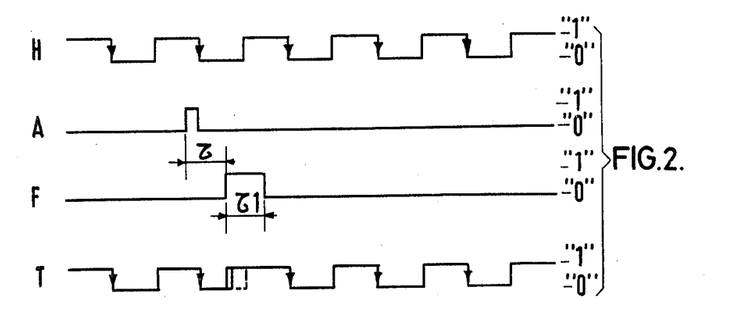
FIG. 2 is a set of waveforms illustrating signals at the designated points in the sending circuit of FIG. 1.

A clock source 3 forming part of sending circuit 1 produces two-level periodic signals on a wire H, as shown by waveform H in FIG. 2. The two levels are separated by transitions in one direction and then in the other, i.e., rising and falling transitions. Arrows on the waveforms in FIGS. 2 and 3 indicate the falling edges of the various signals.

The auxiliary signals to be transmitted are produced by a divide-by-4 frequency divider circuit 4, whose input is connected to wire H and which produces a pulse on a wire A as soon as the appropriate number of clock signal periods has been counted. This pulse on wire A is shown by waveform A in FIG. 2.

In accordance with the present invention, a time shifting device 10 is provided in the sending circuit 1 output for shifting in time the transitions in a first direction of the clock signal as a function of the auxiliary signals. Device 10 has its two inputs connected to wires A and H. A device detecting the shift in time of the transitions of the transmitted clock signals at the receiving circuit 2 inputs is provided for each receiving circuit in order to produce the auxiliary signals transmitted in this manner on the output S' of receiving circuits 2. This detector forming part of receive circuit $2_1$ is the only one shown in detail at $11_1$ in FIG. 1.

In the system shown in FIG. 1, each receiving circuit possesses a pulse shaping device $13_1$ for regenerating the clock signals from the transitions in the second direction (falling edges) and making them available on the receiving circuit output $S_1$ of receiving circuit $2_1$. The device 10 for shifting the transitions in the first direction (rising edge) includes a delayed pulse shaping circuit 20, whose input is connected to wire A, and of an AND gate 21, one input of which is connected to output F of circuit 20 and whose other input is connected to wire H, and whose output constitutes the output T of the sending circuit 1.

In the example described, the detector $11_1$ is a retriggering monostable multivibrator. This monostable multivibrator of the retriggering type is a logic device which triggers for a predetermined duration TM (in this example, slightly longer than the clocking signal period) at each rising edge of the signal applied to its input. The signal produced by the monostable multivibrator is applied via a wire $G_1$ to a pulse-shaping circuit $22_1$, on whose output $S'_1$ appears the transmitted auxiliary signals.

Figure 3:
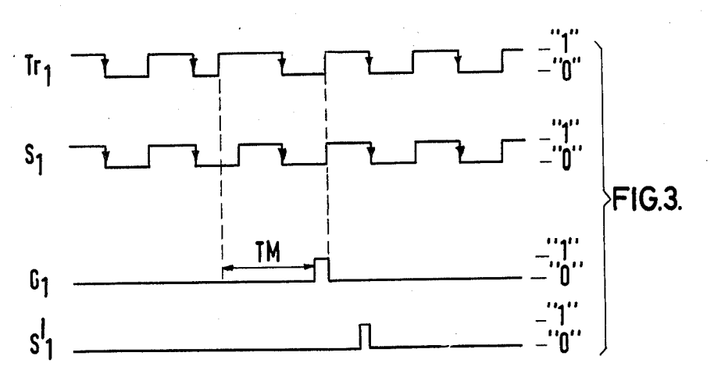
FIG. 3 is a set of waveforms illustrating signals at the designated points in the receiving circuit of FIG. 1.

The operation of the system shown in FIG. 1 is illustrated by FIGS. 2 and 3.

As shown by waveform H in FIG. 2, the rising and falling edges of the clock signal are regularly spaced in time.

The pulse appearing on output A of the divider 4 as shown by waveform A in FIG. 2 produces on output F of circuit 20 another pulse which is delayed by an interval $\tau$ with respect to the preceding pulse and which has a duration of $\tau 1$ as shown by waveform F in FIG. 2. The time-constants $\tau$ and $\tau 1$ are chosen such that the first edge of the delayed pulse on output F occurs before a rising edge of the clock signal and such that the second edge occurs after this same rising edge.

It is seen in waveform T in FIG. 2 that the falling edges of the transmission signal, i.e., the signal on wire T, are still regularly spaced in time, while the spacing of the rising edges on the output T of gate 21 is altered by the pulse on output F. The rising edge which has been shifted in time is shown by a double line in waveform T of FIG. 2.

The transmitted signal available on input $Tr_1$ of one of the receive circuits as shown by waveform $Tr_1$ in FIG. 3 is identical with the signal on output T, except that it is delayed by the propagation time required for transmitting this signal from the sending circuit to the receiving circuit.

A pulse is generated from each transition of the transmitted signal by circuit $13_1$, and in this example the width of this pulse is equal to half the period of the clock signal, the latter thus being obtained on terminal $S_1$ as shown by waveform $S_1$ in FIG. 3.

A monostable multivibrator $11_1$ is used for reconstituting or recovering the auxiliary signal. The signal on output $G_1$ of monostable $11_1$ as shown by waveform $G_1$ in FIG. 3 remains a logical "0" as long as the rising edges of the transmitted signal are spaced by an interval of time TM which, as described above, is equal to or slightly longer than the clock period.

As soon as the spacing between these transitions exceeds this duration, the signal on output $G_1$ changes to a logical "1," changing back to a logical "0" at the next rising edge. It is possible to generate a suitably delayed pulse of appropriate width on output $S'_1$ as shown by waveform $S'_1$ in FIG. 3 from the signal produced by monostable multivibrator $11_1$, such that the signals on outputs $S'_1$ and $S_1$ can be used under suitable condition by the user circuits connected to these terminals $S_1$ and $S'_1$.

Figure 4:
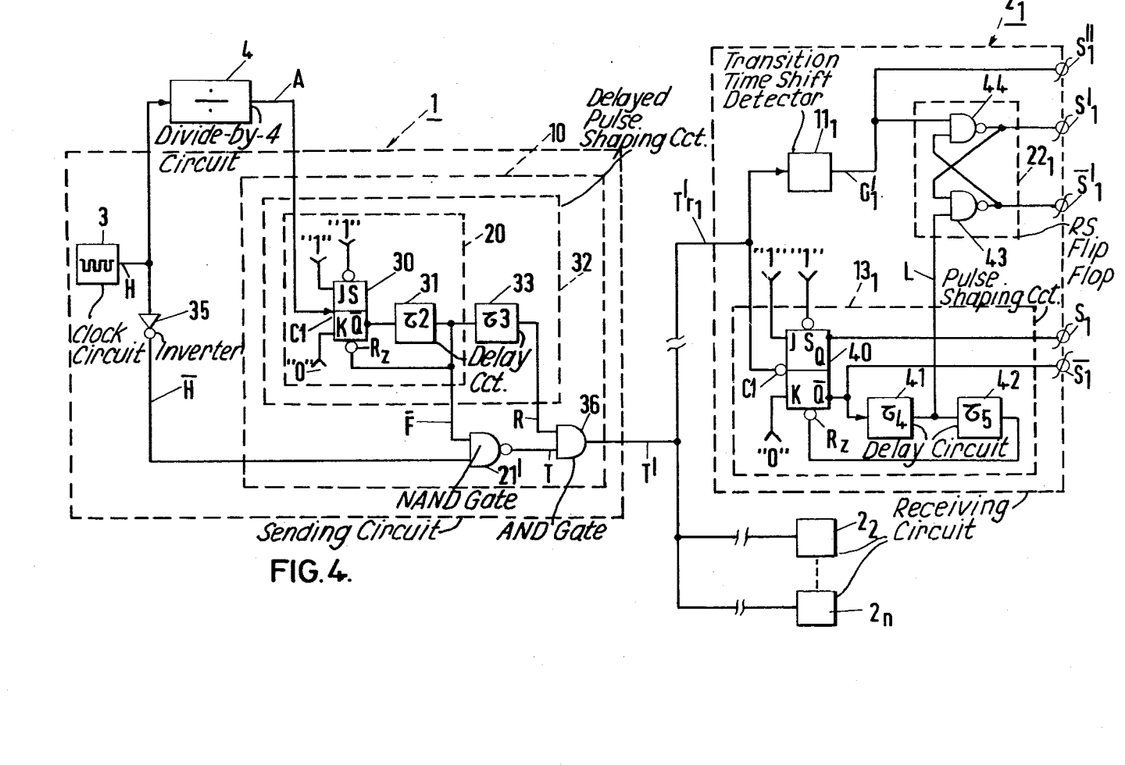
FIG. 4 is a more detailed block diagram of a second embodiment of the transmission system in accordance with the principles of the present invention.

A second embodiment of the present invention is shown in FIG. 4, in which components common with those of FIG. 1 have the same reference numbers.

The delayed pulse shaping circuit 20 in the sending circuit 1 includes a type JK flip-flop 30, whose inputs J and S are permanently fed with a logic signal representing a logical "1," while input K is fed with a logical "0." The triggering signal input C1 is connected to wire A, while output $\overline{Q}$ of flip-flop 30 is connected to the input of a delay circuit 31 producing a delay of $\tau 2$. The output of delay circuit 31 is connected to the reset input Rz of flip-flop 30. Circuit 10 possesses a delayed pulse shaping circuit 32. The latter consists of the first circuit 20, to which is added a delay circuit 33 producing a delay of $\tau 3$, the input of circuit 33 being connected to the output of circuit 31 and the output of circuit 33 being connected to a wire R.

Circuit 10 also includes a NAND gate 21', whose output is connected to wire T, and which has one input connected to the output of an inverter 35 and the other input to wire $\overline{F}$ connected to the output of circuit 31. The input of inverter 35 is connected to the output of clock source 3.

Circuit 10 also possesses an AND gate 36, having one input connected to wire R and the other to wire T, and whose output is connected to wire T'.

The pulse-shaping device $13_1$ in the receiving circuit $2_1$ consists of a type JK flip-flop 40. Inputs S and J of flip-flop 40 are permanently fed with a logical "1" signal, while input K is fed with a logical "0" signal. The triggering signal input C1 is connected to input $Tr'_1$ of the receiving circuit $2_1$. Output Q produces the output signal $S_1$, while output $\overline{Q}$ produces the complementary signal $\overline{S}_1$. Two delay circuits 41 and 42 connected in cascade are also provided, producing delays of $\tau 4$ and τ5, respectively. The input of circuit 41 is connected to output $\overline{Q}$ of flip-flop 40, and the output of circuit 42 is connected to input Rz of flip-flop 40. The output terminal of circuit 41 is connected to one input of a type RS flip-flop constituting circuit $22_1$, this flip-flop being formed in a conventional manner by two NAND gates 43 and 44. The other input of this flip-flop is connected to the output of circuit $11_1$. In this practical example shown in FIG. 4, the complementary output signal of detector $11_1$ obtained on wire $G'_1$ can be directly used by user circuits connected to terminal S″1. Circuit $22_1$ positions the auxiliary signal in time with respect to the clock signal. The auxiliary signal positioned in time is made available on terminal $S'_1$, the complementary signal being obtained on terminal $\overline{S'}_1$.

Figure 5:
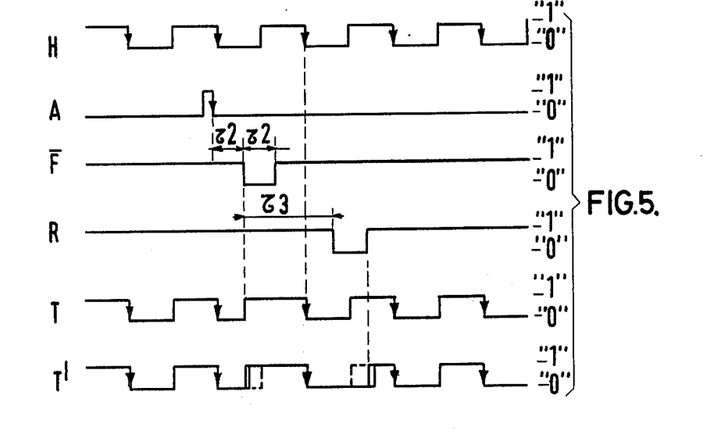
FIG. 5 is a set of waveforms illustrating signals at the designated points in the sending circuit of FIG. 4.
Figure 6:
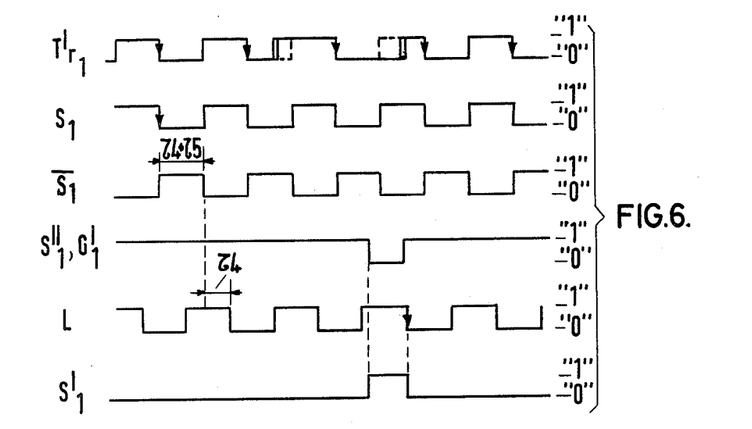
FIG. 6 is a set of waveforms illustrating signals at the designated points in a receiving circuit of FIG. 4.

The operation of the system shown in FIG. 4 is illustrated by FIGS. 5 and 6 where the letter associated with a waveform illustrates the waveform in the system of FIG. 4 at the location of the identical letter.

In the system of FIG. 4, the sending circuit 1 differs essentially from that shown in FIG. 1 by the fact that it is designed for shifting two successive rising edges in time. For this purpose, two pulses made available on $\overline{F}$ and R are generated by circuits 20 and 32 from the pulse appearing on wire A. The delay times τ2 and τ3 are chosen such that the leading edge of the pulse appearing on wire F occurs before the leading edge of the clock signal appearing on wire H, and such that the trailing edge of the pulse appearing on wire R occurs after the rising edge of the next clock signal. It should be understood that the trailing edge of the pulse on wire $\overline{F}$ appears after the rising edge of the clock signal and that the leading edge of the pulse on wire R appears before the rising edge of the clock signal. The logic signal appearing at T is the same as that described for FIG. 1. The waveform of the transmission signal on output T' is that shown by waveform T' in FIG. 5. The shifted edges are also shown by double lines.

Operation of the receiving circuit is practically the same as that described for FIG. 1. The essential difference is produced by circuit $22_1$, which uses a signal derived from circuit $13_1$. By suitable choice of delays τ4 and τ5, time relations between the clock signals and auxiliary signals can be obtained, allowing considerable operational flexibility.

Figure 7:
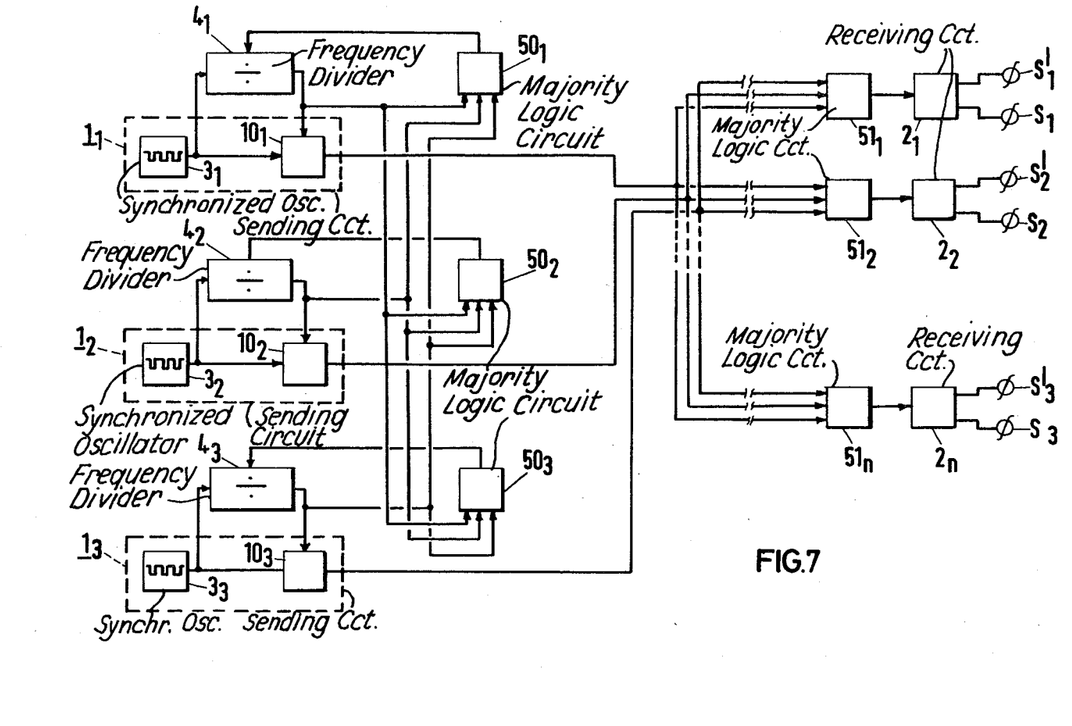
FIG. 7 is a block diagram of a third embodiment of a transmission system in accordance with the principles of the present invention.

FIG. 7 shows a third embodiment of the present invention employing three oscillators synchronized from one of two possible reference oscillators. The synchronized oscillators $3_1$, $3_2$ and $3_3$ in FIG. 7 form part of the sending circuits $1_1$, $1_2$ and $1_3$, which possess circuits $10_1$, $10_2$ and $10_3$, respectively, having the components as circuit 10 in FIG. 4. The auxiliary signals are obtained from frequency-dividers $4_1$, $4_2$ and $4_3$, each of which is assigned to a sending circuit and provided with an energization control input connected to the output of a majority logic circuit $50_1$, $50_2$ or $50_3$. The inputs of these majority logic circuits $50_1$, $50_2$ and $50_3$ are connected to the outputs of frequency-dividers $4_1$, $4_2$ and $4_3$.

The auxiliary signals and clock signals are transmitted over three wires, and majority logic circuits $51_1$, $51_2$, . . . $51_n$ are also connected to the receiving circuits $2_1$, $2_2$, . . . $2_n$, respectively.

The present invention thus makes it possible to reduce considerably the number of wires required for transmitting the clock and auxiliary signals.

Although the principles of the present invention are described above in relation with specific practical examples, it should be clearly understood that this description is given as an example only and does not limit the scope of the invention.

In particular, the invention can be easily applied for transmitting different kinds of auxiliary signals. The transitions in the first direction are shifted in time by a given amount for each kind. It is then always possible by means of retriggering monostable multivibrators at the receiving end to determine these different shifts and to allow the utilization of these different kinds of signals by means of logic circuits connected to the outputs of these monostable multivibrators.

While I have described above the principles of my invention in connection with specific apparatus it is to be clearly understood that this description is made only by way of example and not as a limitation to the scope of my invention as set forth in the objects thereof and in the accompanying claims.

I claim:

1. A transmission system for transmitting clock signals and auxiliary signals from a sending circuit to at least one receiving circuit comprising:

said sending circuit including
first means to produce periodic two-level clock signals each having a first transition in one direction and a second transition in a direction opposite said one direction; and
second means coupled to said first means to shift in time one of said first and second transitions as a function of said auxiliary signals; and said receiving circuit including
third means coupled to said second means to detect said shift in time of said one of said first and second transitions and to produce said auxiliary signals as a first output signal of said receiving circuit; and
fourth means coupled to said second means to generate said clock signals from the other of said first and second transitions and to provide said clock signals as a second output signal of said receiving circuit;

said fourth means including
a pulse shaping circuit;
said third means including
a retriggering monostable multivibrator; and said second means including
a delayed pulse shaping device controlled by said auxiliary signals, and
a logic gate coupled to said delayed pulse shaping device and said first means to combine the output signal of said delayed pulse shaping device and said clock signals to provide said shift in time of said one of said first and second transitions.

2. A transmission system for transmitting clock signals and auxiliary signals from a sending circuit to at least one receiving circuit comprising:

said sending circuit including
first means to produce periodic two-level clock signals each having a first transition in one direction and a second transition in a direction opposite said one direction; and
second means coupled to said first means to shift in time one of said first and second transitions as a function of said auxiliary signals; and said receiving circuit including
third means coupled to said second means to detect said shift in time of said one of said first and second transitions and to produce said auxiliary signals as a first output signal of said receiving circuit; and fourth means coupled to said second means to generate said clock signals from the other of said first and second transitions and to provide said clock signals as a second output signal of said receiving circuit;

said fourth means including
a pulse shaping circuit; said third means including
a retriggering monostable multivibrator; and said second means including
a delayed pulse shaping device controlled by said auxiliary signals to produce a first output pulse,
a time delay means coupled to said delayed pulse shaping device to produce a second output pulse,
said first output pulse and said second output pulse each corresponding in time to two successive transitions of said one of said first and second transitions,
a first logic gate coupled to said first means and said delayed pulse shaping device to combine said first output pulse and said clock signals, and
a second logic gate coupled to said delay means and said first logic gate to combine said second output pulse and an output signal from said first logic gate to provide said shift in time of said one of said first and second transitions in adjacent ones of said clock signals.

3. A transmission system for transmitting clock signals and auxiliary signals from a sending circuit to at least one receiving circuit comprising:
said sending circuit including
first means to produce periodic two-level clock signals each having a first transition in one direction and a second transition in a direction opposite said one direction; and
second means coupled to said first means to shift in time one of said first and second transitions as a function of said auxiliary signals; and
said receiving circuit including
third means coupled to said second means to detect said shift in time of said one of said first and second transitions and to produce said auxiliary signals as an output signal of said receiving circuit;
said third means including
a retriggering monostable multivibrator; and said second means including
a delayed pulse shaping device controlled by said auxiliary signals, and
a logic gate coupled to said delayed pulse shaping device and said first means to combine the output signal of said delayed pulse shaping device and said clock signals to provide said shift in time of said one of said first and second transitions.

4. A transmission system for transmitting clock signals and auxiliary signals from a sending circuit to at least one receiving circuit comprising:
said sending circuit including
first means to produce periodic two-level clock signals each having a first transition in one direction and a second transition in a direction opposite said one direction; and
second means coupled to said first means to shift in time one of said first and second transitions as a function of said auxiliary signals; and
said receiving circuit including
third means coupled to said second means to detect said shift in time of said one of said first and second transitions and to produce said auxiliary signals as an output signal of said receiving circuit;
said third means including
a retriggering monostable multivibrator; and said second means including
a delayed pulse shaping device controlled by said auxiliary signals to produce a first output pulse,
a time delay means coupled to said delayed pulse shaping device to produce a second output pulse,
said first output pulse and said second output pulse each corresponding in time to two successive transitions of said one of said first and second transitions,
a first logic gate coupled to said first means and said delayed pulse shaping device to combine said first output pulse and said clock signals, and
a second logic gate coupled to said delay means and said first logic gate to combine said second output pulse and an output signal from said first logic gate to provide said shift in time of said one of said first and second transitions in adjacent ones of said clock signals.

5. A transmission system for transmitting clock signals and auxiliary signals from a sending circuit to at least one receiving circuit comprising:
said sending circuit including
first means to produce periodic two-level clock signals each having a first transition in one direction and a second transition in a direction opposite said one direction; and
second means coupled to said first means to shift in time one of said first and second transitions as a function of said auxiliary signals; and
said receiving circuit including
third means coupled to said second means to detect said shift in time of said one of said first and second transitions and to produce said auxiliary signals as an output signal of said receiving circuit;
said second means including
a delayed pulse shaping device controlled by said auxiliary signals, and
a logic gate coupled to said delayed pulse shaping device and said first means to combine the output signal of said delayed pulse shaping device and said clock signals to provide said shift in time of said one of said first and second transitions.

6. A transmission system for transmitting clock signals and auxiliary signals from a sending circuit to at least one receiving circuit comprising:
said sending circuit including
first means to produce periodic two-level clock signals each having a first transition in one direction and a second transition in a direction opposite said one direction; and
second means coupled to said first means to shift in time one of said first and second transitions as a function of said auxiliary signals; and
said receiving circuit including
third means coupled to said second means to detect said shift in time of said one of said first and second transitions and to produce said auxiliary signals as an output signal of said receiving circuit;

said second means including
a delayed pulse shaping device controlled by said auxiliary signals to produce a first output pulse,
a time delay means coupled to said delayed pulse shaping device to produce a second output pulse,
said first output pulse and said second output pulse each corresponding in time to two successive transitions of said one of said first and second transitions,
a first logic gate coupled to said first means and said delayed pulse shaping device to combine said first output pulse and said clock signals, and
a second logic gate coupled to said delay means and said first logic gate to combine said second output pulse and an output signal from said first logic gate to provide said shift in time of said one of said first and second transitions in adjacent ones of said clock signals.

7. A sending circuit for transmitting clock signals and auxiliary signals to at least one receiving circuit comprising:

first means to produce periodic two-level clock signals each having a first transition in one direction and a second transition in a direction opposite said one direction, and
second means coupled to said first means to shift in time one of said first and second transitions as a function of said auxiliary signals;
said second means including
a delayed pulse shaping device controlled by said auxiliary signals, and
a logic gate coupled to said delayed pulse shaping device and said first means to combine the output signal of said delayed pulse shaping device and said clock signals to provide said shift in time of said one of said first and second transitions.

8. A sending circuit for transmitting clock signals and auxiliary signals to at least one receiving circuit comprising:

first means to produce periodic two-level clock signals each having a first transition in one direction and a second transition in a direction opposite said one direction, and
second means coupled to said first means to shift in time one of said first and second transitions as a function of said auxiliary signals;
said second means including
a delayed pulse shaping device controlled by said auxiliary signals to produce a first output pulse,
a time delay means coupled to said delayed pulse shaping device to produce a second output pulse,
said first output pulse and said second output pulse each corresponding in time to two successive transitions of said one of said first and second transitions,
a first logic gate coupled to said first means and said delayed pulse shaping device to combine said first output pulse and said clock signals, and
a second logic gate coupled to said delay means and said first logic gate to combine said second output pulse and an output signal from said first logic gate to provide said shift in time of said one of said first and second transitions in adjacent ones of said clock signals.

* * * * *